United States Patent
Chen

(10) Patent No.: US 7,617,413 B2
(45) Date of Patent: Nov. 10, 2009

(54) METHOD OF PREVENTING ERRONEOUS TAKE-OVER IN A DUAL REDUNDANT SERVER SYSTEM

(75) Inventor: Chih-Wei Chen, Taipei (TW)

(73) Assignee: Inventec Corporation, Taipei (TW)

( * ) Notice: Subject to any disclaimer, the term of this patent is extended or adjusted under 35 U.S.C. 154(b) by 405 days.

(21) Appl. No.: 11/637,806

(22) Filed: Dec. 13, 2006

(65) Prior Publication Data

US 2008/0148098 A1 Jun. 19, 2008

(51) Int. Cl.
*G06F 11/00* (2006.01)
(52) U.S. Cl. ........................................ 714/13
(58) Field of Classification Search ............... 714/11, 714/13, 55
See application file for complete search history.

(56) References Cited

U.S. PATENT DOCUMENTS

| | | | | |
|---|---|---|---|---|
| 5,696,895 | A * | 12/1997 | Hemphill et al. | 714/4 |
| 6,460,149 | B1 * | 10/2002 | Rowlands et al. | 714/43 |
| 6,622,163 | B1 * | 9/2003 | Tawill et al. | 709/211 |
| 6,934,880 | B2 * | 8/2005 | Hofner | 714/10 |
| 6,944,785 | B2 * | 9/2005 | Gadir et al. | 714/4 |
| 6,990,320 | B2 * | 1/2006 | LeCren | 455/67.11 |
| 7,480,827 | B2 * | 1/2009 | Callaway et al. | 714/38 |
| 2003/0177228 | A1 * | 9/2003 | Vigouroux et al. | 709/224 |
| 2004/0034871 | A1 * | 2/2004 | Lu et al. | 725/111 |
| 2006/0047836 | A1 * | 3/2006 | Rao et al. | 709/229 |
| 2006/0085669 | A1 * | 4/2006 | Rostron et al. | 714/4 |
| 2007/0201456 | A1 * | 8/2007 | Bettis et al. | 370/356 |
| 2008/0016389 | A1 * | 1/2008 | Talaugon et al. | 714/4 |

* cited by examiner

*Primary Examiner*—Marc Duncan
(74) *Attorney, Agent, or Firm*—Bacon & Thomas, PLLC

(57) ABSTRACT

The present invention discloses a method for preventing erroneous take-over in a redundant server system, and the method is used for a server system having a primary server for continuously producing heartbeat packets and sending the heartbeat packets to a redundant server of the server system. If the redundant server has not received any heartbeat packet, a redundant external transmission unit of the redundant server will send a detecting signal to the primary server. If the redundant external transmission unit has not received an acknowledged signal from the primary server, the redundant server will take over the primary server to continue providing network services.

9 Claims, 4 Drawing Sheets

METHOD OF PREVENTING ERRONEOUS TAKE-OVER IN A DUAL REDUNDANT SERVER SYSTEM

FIELD OF THE INVENTION

The present invention relates to a method of preventing erroneous take-over in a dual redundant server system, and more particularly to a method applied to a server system having a primary server and a redundant server, where the redundant server will take over the primary server to provide network services when the redundant server has not received a heartbeat packets and an acknowledged signal from the primary server, so as to prevent a conflict caused by a misjudgment for the redundant server to erroneously take over the primary server while the primary server is not failed.

BACKGROUND OF THE INVENTION

Since it is an era with well-developed information technologies and a blooming electronic industry, various different high-tech products are derived from computers, and the mobile communication is developed rapidly. All these technologies and products are indispensable to our life and shorten the time and space between people. As the present electronic products (such as computers) and communication technology (such as network) become more popular and extensively used, and manufactures are promoting their products and service with incentives, the market competition is getting increasingly severer.

Major manufacturers constantly introduce innovative products to attract consumers, since the consumer's demand for electronic products and communication services becomes increasingly higher. Thus, a more convenient electronic product and a faster communication service are considered as important indexes for determining whether or not the high-tech products and communication service of one country leads the others.

The so-called "server" refers to a high performance computer primarily used as a node for a network to store or process data on the network, and a general server comprises a processor, a hard disk, a memory and a system bus, and these components are made specifically for network applications, so that the server can have higher processing capability, stability, reliability, safety, expandability and manageability. Particularly, when the information technology advances and the information flow requirements grow steadily, it is very common for a server of a company or an organization to provide related information, downloads and email services. Therefore, processing capability and stability are considered as major factors for a stable humanistic information application and a service environment.

To avoid abnormal situations of a server due to various causes and result in an interrupt of data access or network service, some manufacturers developed a dual redundant server system as shown in FIG. 1. The system 1 includes a master control module 10 and a slave control module 12, wherein the master control module 10 sends or receives data packets between the server system 1 and a network 2, such that the server system 1 can send and receive data packets (such as network information including related information, downloads and emails) with the network 2 to provide related network information services.

To avoid abnormal situations of the master control module 10 that result in an interrupt service of the server system 1, the master control module 10 normally sends a heartbeat packet to a slave control module 12 for every predetermined time through an inspecting transmission module 14 installed between the control modules 10, 12. If the slave control module 12 receives the heartbeat packet in every predetermined time, the counting of time will be reset, and it continues to determine whether or not the heartbeat packet is received within the predetermined time. If the master control module 10 is abnormal and has not sent the heartbeat packet to the slave control module 12 within the predetermined time, the slave control module 12 will take over the master control module 10 immediately, so as to keep sending and receiving network packets between the server system 1 and the network 2.

However, traditional dual redundant server systems usually have a problem that the slave control module 12 often takes over the master control module 10 to send and receive data packets between the server system 1 and the network 2, even if the master control module 10 is not abnormal or failed. There exists a conflict between the master control module 10 and the slave control module 12, if the inspecting transmission module 14 fails to send the heartbeat packet from the master control module 10 to the slave control module 12, and thus the slave control module 12 misjudges that the master control module 10 is failed and takes over the master control module 10. As a result, there is a conflict between the master control module 10 and the slave control module 12, not only failing to send or receive data packets between the server system 1 and the network 2, but also damaging or losing data of the server system 1.

SUMMARY OF THE INVENTION

In view of the shortcomings of the traditional dual redundant server systems that may misjudge a failure of the control module due to a failed inspecting transmission module and take over the master and result in a conflict between the control modules, the inventor of the present invention based on years of experience to conduct extensive researches and experiments, and finally invented a method of preventing erroneous take-over in a dual redundant server system in accordance with the present invention.

Therefore, it is a primary objective of the present invention to provide a method of preventing erroneous take-over in a dual redundant server system, and the method is applied to a server system, and the server system has a primary server and a redundant server. The primary server is provided for continuously producing heartbeat packets and sending the heartbeat packets to a redundant server of the server system. If the redundant server has not received the heartbeat packets, a redundant external transmission unit of the redundant server will send a detecting signal to the primary server. If the redundant external transmission unit has not received an acknowledged signal from the primary server, the redundant server will take over the primary server to provide network services. Therefore, the invention can prevent a conflict caused by a misjudgment for the redundant server to erroneously take over the primary server while the primary server is not failed.

To make it easier for our examiner to understand the objective, technical characteristics and performance of the present invention, preferred embodiments accompanied with related drawings are used for illustrating the present invention as follows.

DETAILED DESCRIPTION OF THE PREFERRED EMBODIMENTS

Figure 1:
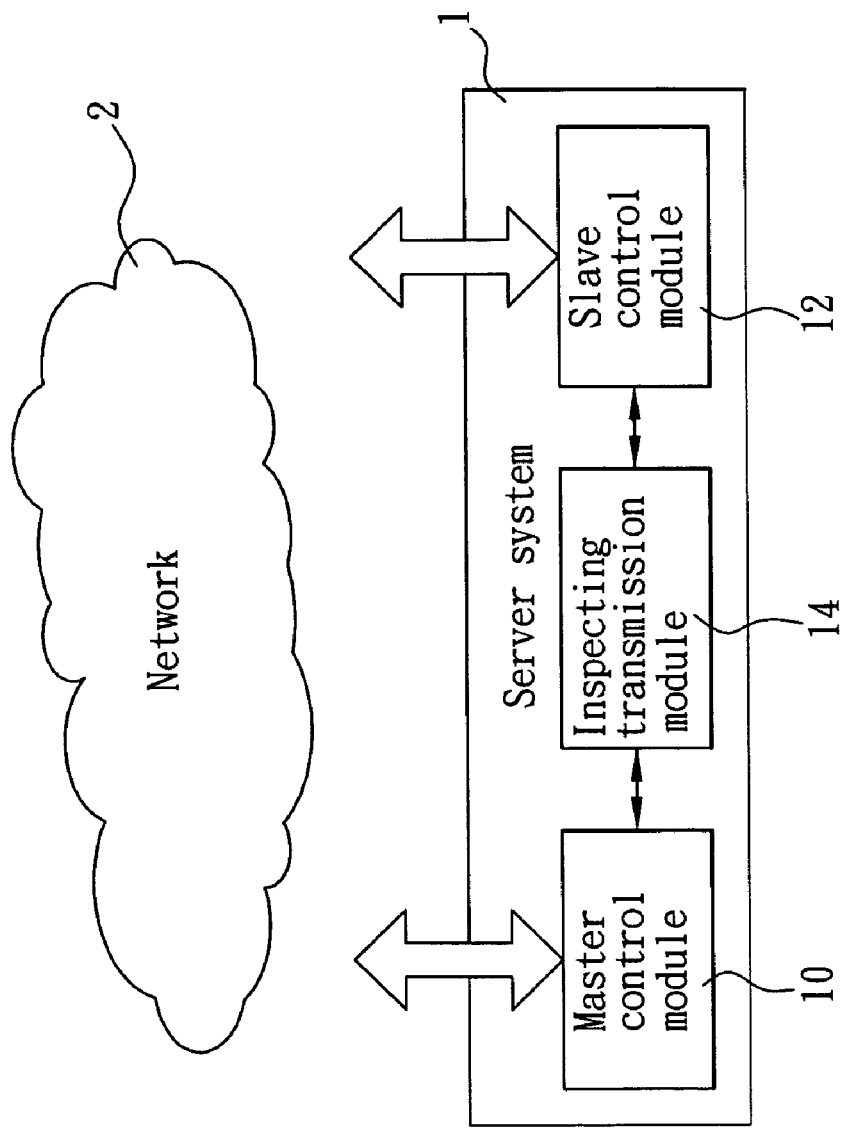
FIG. 1 is a schematic view of a traditional dual redundant server system.
Figure 2:
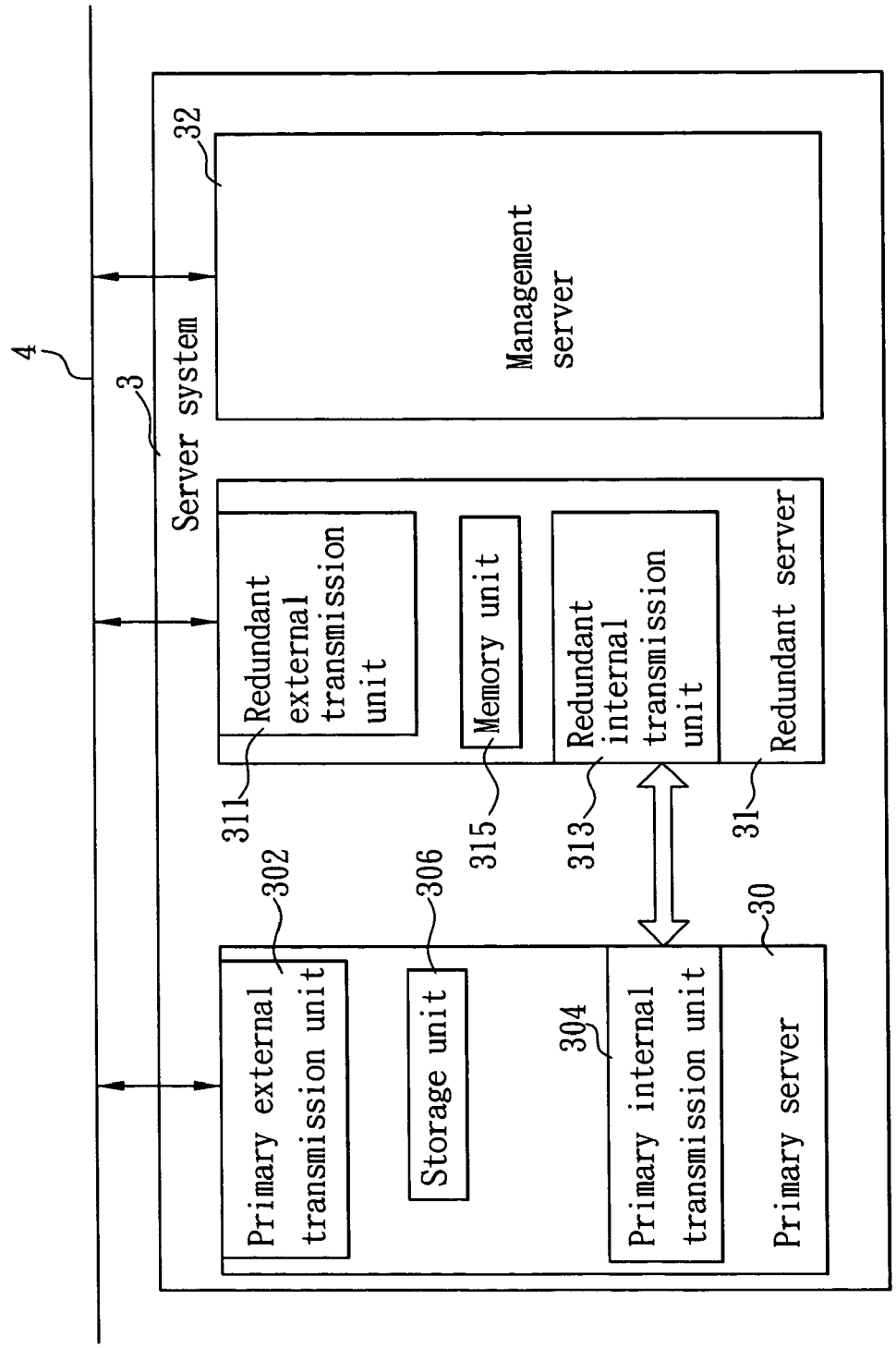
FIG. 2 is a schematic view of a server of the present invention.

Referring to FIG. 2 for a method of preventing erroneous take-over in a dual redundant server system in accordance with the present invention, a server system 3 includes a primary server 30 and a redundant server 31, and the primary server 30 keeps producing heartbeat packets, and sends the heartbeat packets to the redundant server 31. If the redundant server 31 has not received any heartbeat packet, a redundant external transmission unit 311 of the redundant server 31 will send a detecting signal to the primary server 30 to detect whether or not the primary server 30 is abnormal or failed. If the redundant external transmission unit 311 has not received an acknowledged signal sent from the primary server 30, it indicates that the primary server 30 is failed or abnormal, and the redundant server 31 will immediately take over the primary server 30 to continue providing network services. Such arrangement can prevent a conflict between the servers 30, 31 or an interrupt of services of the server system 3, if the equipment for sending the heartbeat packet breaks down and the primary server 30 works properly, but the redundant server 31 erroneously takes over the primary server 30. As a result, the invention can avoid damaging or losing data of the server system 3.

Figure 3:
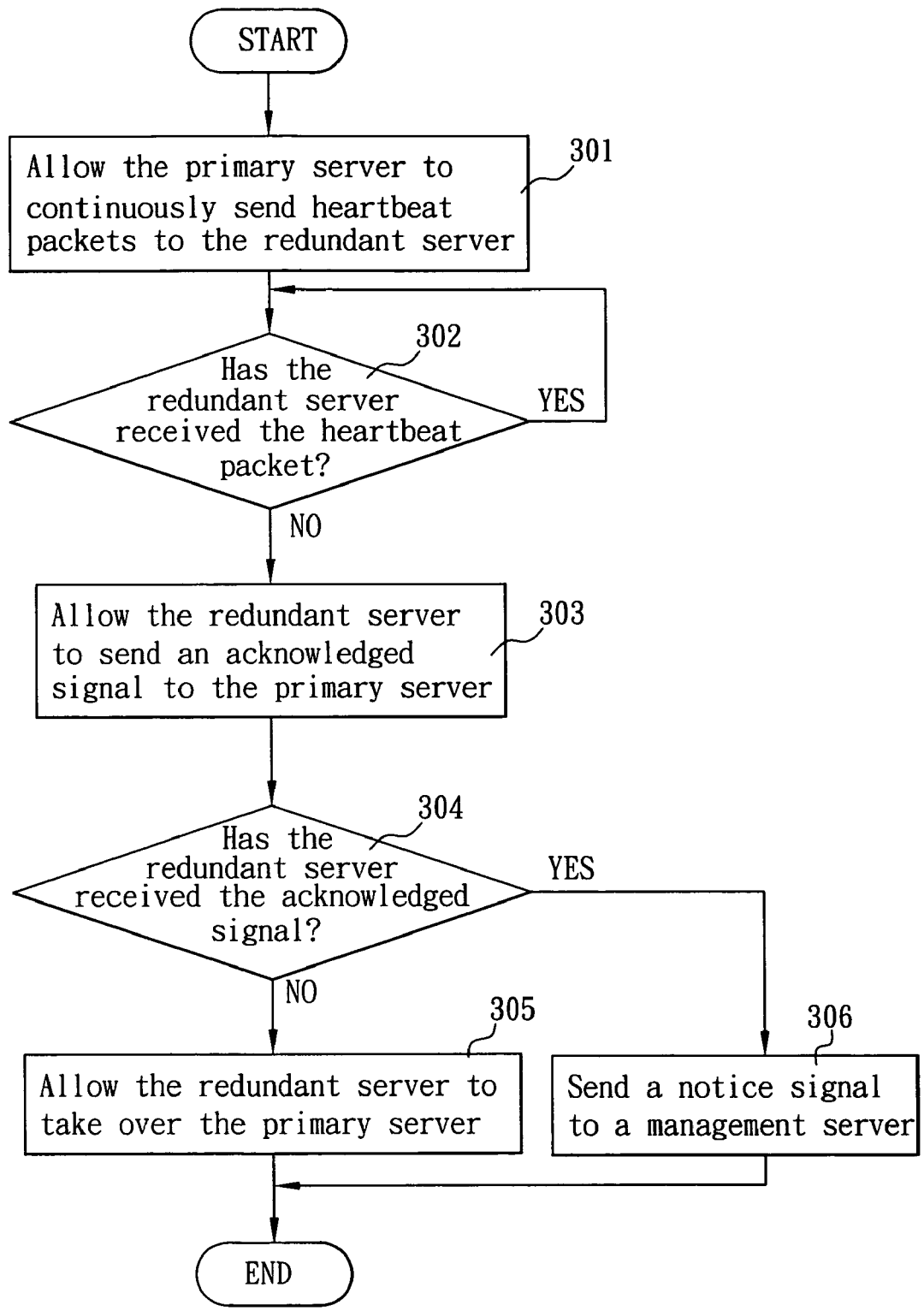
FIG. 3 is a flow chart of a main procedure of the present invention.

Referring to FIG. 3 for the illustration of the present invention, the method of the invention process a procedure as follows:

Step (301): Continuously outputting the heartbeat packet to the redundant server 31 by the primary server 30;

Step (302): determining whether or not the redundant server 31 has received the heartbeat packet; if yes, then go to Step (302), or else go to Step (303);

Step (303): allowing the redundant server 31 to send the detecting signal to the primary server 30 through a redundant external transmission unit 311 installed at the redundant server 31;

Step (304): determining whether or not the redundant external transmission unit 311 of the redundant server 31 has received the acknowledged signal; if yes, then go to Step (306), or else go to Step (305);

Step (305): allowing the redundant server 31 to take over the primary server 30 to provide network services; and Step (306): allowing the redundant server 31 to send a notice signal to a management server 32 installed at the server system 3, such that an administrator can know about that no transmission of heartbeat packets can be conducted between the primary server 30 and the redundant server 31.

If the equipment for transmitting heartbeat packets between the primary server 30 and the redundant server 31 fails and the primary server 30 is not damaged or failed, then the redundant server 31 will take over the primary server 30 to avoid any conflict.

In a preferred embodiment of the present invention as shown in FIG. 2, after the detecting signal is sent to the primary server 30, the primary server 30 will produce an acknowledged signal, and then sends the acknowledged signal to the redundant external transmission unit 311 of the redundant server 31 through the primary external transmission unit 302, if a primary external transmission unit 302 installed at the primary server 30 has received the detecting signal. Such arrangement can accurately determine whether or not the primary server 30 is abnormal or damaged, and then determine whether or not to carry out the take-over.

Before the redundant server 31 sends the detecting signal to the primary server 30 as illustrated in the preferred embodiment and shown in FIG. 2, the primary server 30 continuously sends the heartbeat packet to a redundant internal transmission unit 313 installed at the redundant server 31 through a primary internal transmission unit 304 installed at the primary server 30. After the primary server 30 sends the acknowledged signal to the redundant server 31, the primary server 30 continuously produces another heartbeat signal and sends the other heartbeat signal to the redundant server 31 through the primary external transmission unit 302 and the redundant external transmission unit 311. If the redundant external transmission unit 311 of the redundant server 31 has not received the other heartbeat signal, then the redundant server 31 will take over the primary server 30, such that if the primary internal transmission unit 304, the redundant internal transmission unit 313, or the circuit between them is damaged, then the primary external transmission unit 302, the redundant external transmission unit 311 and an extranet 4 will be used to send the heartbeat packet.

After the redundant external transmission unit 311 has received the heartbeat packet as illustrated in this embodiment and shown in FIG. 2, a live flag stored in the redundant server 31 is set to a live state. If the live flag is determined to be set to a live state after the redundant server 31 has detected for a detection time, then the live flag will be set to a clear state. If the redundant external transmission unit 311 has received the heartbeat packet, a live flag stored in the redundant server 31 will be set to a live state, then the set state of the live flag can be used to determine whether or not the primary server 30 normally sends out the heartbeat packet after the redundant server 31 has detected for a detection time. If the live flag is determined to be set to a clear state after the redundant server 31 has detected for a detection time, then the detecting signal will be sent to the primary server 30.

Figure 4:
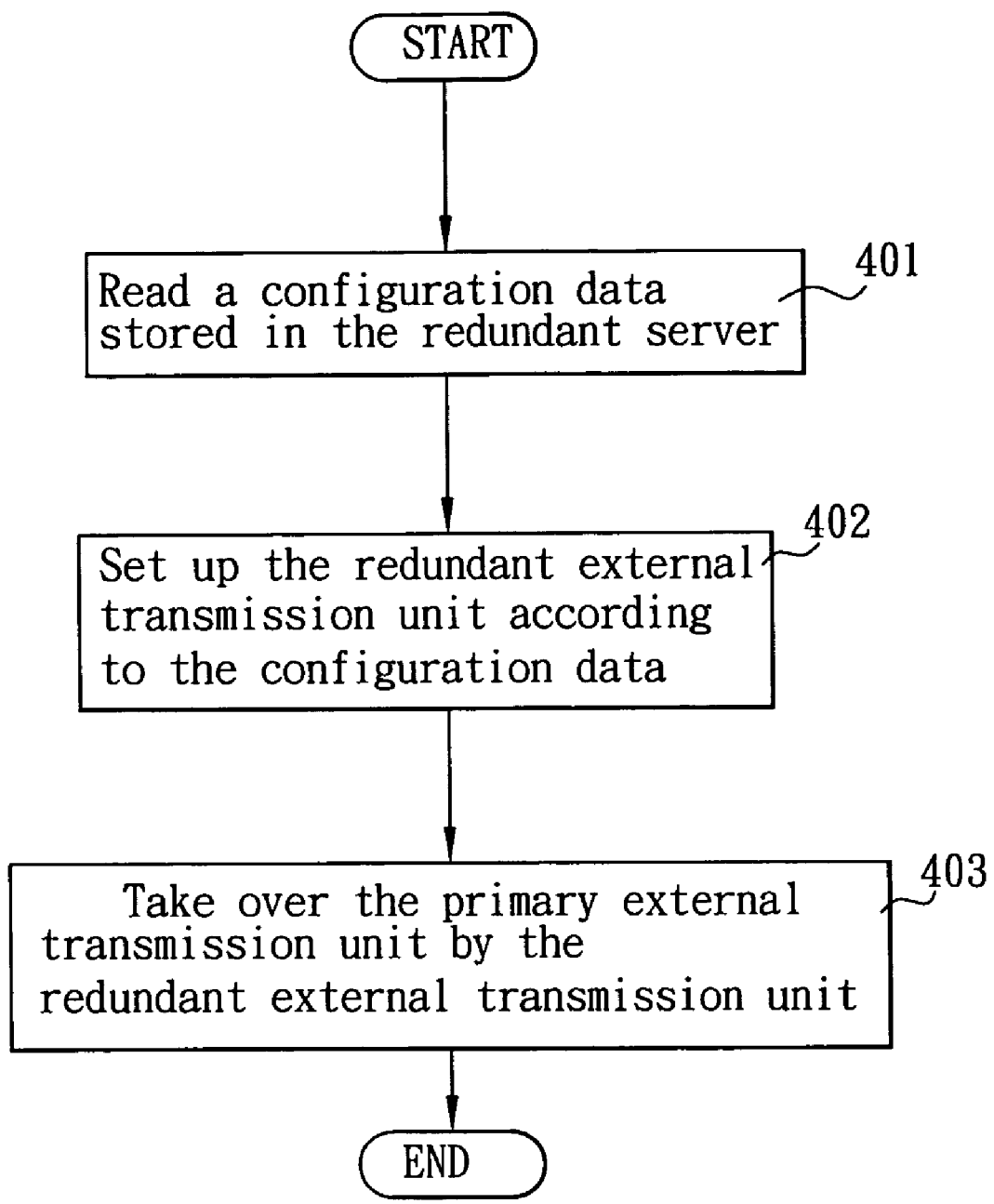
FIG. 4 is a flow chart of a take-over procedure of the present invention.

When the redundant server 31 takes over the primary server 30 as illustrated in the preferred embodiment and shown in FIG. 4, the redundant server 31 processes a procedure comprising the steps of:

Step (401): reading a configuration data stored in a memory unit 315 of the redundant server 31;

Step (402): setting the redundant external transmission unit 311 according to the configuration data; and Step (403): taking over the primary external transmission unit 302 by the redundant external transmission unit 311 and obtaining a network identity of the primary server 30 for accessing network packets.

Therefore, the redundant server 31 can be used to quickly obtain the network identity of the primary server 30 for accessing the network packets, and thus greatly reducing the time for the interrupt services of the server system 3.

In the preferred embodiment as shown in FIG. 2, if the primary server 30 has read a configuration setup signal for setting the configuration data, then the configuration setup signal will be used to change the configuration data stored in a storage unit 306 of the primary server 30, and then the changed configuration data will be sent to the redundant server 31 through the primary internal transmission unit 304. After the redundant server 31 has received the changed configuration data, the redundant server 31 saves the changed configuration data into the memory unit 315. By the foregoing method, the configuration data used by the redundant external transmission unit 311 is identical to that of the primary external transmission unit 302, so that the redundant server 31 can take over the primary server 30 quickly, and the time required for the take-over can be reduced greatly.

While the invention herein disclosed has been described by means of specific embodiments, numerous modifications and variations could be made thereto by those skilled in the art without departing from the scope and spirit of the invention set forth in the claims.

What is claimed is:

1. A method of preventing erroneous take-over in a dual redundant server system, which is applied to a server system, and said server system comprises a primary server and a redundant server, and said method comprising the steps of:
   continuously outputting a heartbeat packet to said redundant server by said primary server;
   determining whether or not said redundant server has received said heartbeat packet;
   setting a live flag stored in said redundant server to a live state by said redundant server when said redundant server has received said heartbeat packet;
   producing a detecting signal by said redundant server when said redundant server has not received said heartbeat packet;
   sending said detecting signal to said primary server though a redundant external transmission unit installed at said redundant server; and
   taking over said primary server by said redundant server, when said redundant external transmission unit has not received an acknowledged signal sent from said primary server in response to said detecting signal.

2. The method of preventing erroneous take-over in a dual redundant server system of claim 1, wherein after said redundant server sends said detecting signal to said primary server, said primary server processes a procedure comprising the steps of:
   producing said acknowledged signal, when a primary external transmission unit installed at said primary server receives said detecting signal; and
   sending said acknowledged signal to said redundant external transmission unit of said redundant server through said primary external transmission unit.

3. The method of preventing erroneous take-over in a dual redundant server system of claim 2, wherein after said primary server sends said acknowledged signal to said redundant server, said primary server process a procedure comprising the steps of:
   continuously producing another heartbeat signal; and
   sending said other heartbeat signal to said redundant server through said primary external transmission unit and said redundant external transmission unit.

4. The method of preventing erroneous take-over in a dual redundant server system of claim 3, wherein after said primary server has sent said other heartbeat signal to said redundant server but said redundant external transmission unit of said redundant server has not received said other heartbeat signal, said redundant server takes over said primary server.

5. The method of preventing erroneous take-over in a dual redundant server system of claim 1, wherein when said redundant external transmission unit of said redundant server receives said acknowledged signal, said redundant server processes a procedure comprising the steps of:
   producing a notice signal; and
   sending said notice signal to a management server installed in said server system.

6. The method of preventing erroneous take-over in a dual redundant server system of claim 1 wherein, before said redundant server sends said detecting signal to said primary server, said redundant server detects said live flag every detection time and then sets said live flag to a clear state when said live flag is detected to be in a live state.

7. The method of preventing erroneous take-over in a dual redundant server system of claim 6 wherein, before said redundant server sends said detecting signal to said primary server, said redundant server detects said live flag every detection time and then sends said detecting signal to said primary server when said live flag is set to said clear state.

8. The method of preventing erroneous take-over in a dual redundant server system of claim 7, wherein when said redundant server takes over said primary server, said method further comprising the steps of:
   reading a configuration data stored in said redundant server;
   setting up said redundant external transmission unit according to said configuration data; and
   allowing said redundant external transmission unit to take over said primary external transmission unit and obtain a network identity of said primary server for accessing said network packets.

9. The method of preventing erroneous take-over in a dual redundant server system of claim 8, wherein said method used between said master server and said redundant server further comprises the steps of:
   changing said configuration data stored in said primary server according to said configuration setup signal, when said primary server reads a configuration setup signal for setting up said configuration data;
   sending said configuration data which is changed by said primary server to said redundant server through said primary internal transmission unit; and
   saving said changed configuration data which is received by said redundant server into said redundant server.

* * * * *